US006697237B2

(12) United States Patent
Duve

(10) Patent No.: US 6,697,237 B2
(45) Date of Patent: Feb. 24, 2004

(54) CONVERSION OF STANDARD CLASS A GROUND-FAULT CIRCUIT-INTERRUPTERS, (GFCI), TO A CLASS A GROUND-FAULT CIRCUIT INTERRUPTER WITH OPEN NEUTRAL PROTECTION

(75) Inventor: Jeff Duve, Efland, NC (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 09/737,273

(22) Filed: Dec. 13, 2000

(65) Prior Publication Data

US 2002/0071227 A1 Jun. 13, 2002

(51) Int. Cl.[7] .................................................. H02H 9/08
(52) U.S. Cl. .......................................... 361/42; 361/42
(58) Field of Search ............................ 361/42, 44, 45, 361/46, 47, 56, 93, 118

(56) References Cited

U.S. PATENT DOCUMENTS 5,841,615 A * 11/1998 Gershen ...................... 361/118
6,052,265 A * 4/2000 Zaretsky et al. ............ 340/638
6,381,113 B1 * 4/2002 Legatti ......................... 361/46

* cited by examiner

Primary Examiner—Gregory J. Toatley, Jr.
Assistant Examiner—Danny Nguyen
(74) Attorney, Agent, or Firm—Thomas, Kayden, Horstemeyer & Risley, LLP

(57) ABSTRACT

The present invention concerns an improved ground fault circuit interrupt outlet. The device includes a voltage sensitive device which is capable of conducting current at a predetermined voltage. The voltage sensitive device is electrically connected between a ground on the ground fault circuit interrupt outlet and a neutral located on the ground fault circuit interrupt outlet. Arranging the device in this manner converts the ground fault circuit interrupt outlet into a ground fault circuit interrupt with open neutral protection.

20 Claims, 1 Drawing Sheet

CONVERSION OF STANDARD CLASS A GROUND-FAULT CIRCUIT-INTERRUPTERS, (GFCI), TO A CLASS A GROUND-FAULT CIRCUIT INTERRUPTER WITH OPEN NEUTRAL PROTECTION

BACKGROUND OF THE INVENTION

A ground-Fault Circuit-Interrupter (hereby referred to as GFCI) is a device that is intended to reduce the chance of accidental electrocution by interrupting the power line, when the difference in current between the Line (the black wire) and Neutral (the white wire) is greater than a predetermined level as set by Underwriter's Laboratories ("UL") in UL943. When properly connected, a standard GFCI will protect against any Line-to-Earth Ground faults, thus protecting the end user from potentially fatal electrocution. The standard Class A GFCI was originally intended for use in wall mount applications near any potential ground fault locations such as bathrooms, kitchen counter-tops etc. In order to pass inspection, all outlets are to be electrically tested to ensure proper connection. Since the wiring in the walls does not move, the probability of a loose or broken connection after testing is unlikely. The success of the in-wall GFCI has prompted its use in other alternate locations. One of the prime candidates for a GFCI is its use on the end of an extension cord. The problem with an extension cord is that it is exposed to potential damage, which may break some of the wires in the cord, and thus, render the GFCI inoperative. This is so because the standard Class A GFCI utilizes the power from Line to Neutral in order to operate the unit. Should the Neutral connection be severed, the standard GFCI will no longer function. In order to address this issue, UL now requires, in UL153 for Portable Electric Lamps, that the Class A GFCI incorporate "open neutral protection." This provision protects against only a broken Neutral wire from disabling the GFCI. The "open neutral provision" will not protect against both the Open Neutral and Open Earth Ground failure mode.

SUMMARY OF THE INVENTION

Current Open Neutral protection is presently being provided by either an external relay that is powered by the Line-to-Neutral Voltage or by constructing a custom GFCI with an intrinsic relay/circuit breaker combination. Both solutions incorporate another magnetic circuit that tends to either take up more space or impact on product cost.

The major problem with the current standard Class A GFCI is that it requires power from Line to Neutral in order to function. When the Neutral connection is broken, the GFCI no longer has the energy to function. From an ideal electrical point of view, the potential difference between the Neutral and Earth Ground is Zero. In the real world, however, it tends to be on the order of a couple of Volts, depending on Neutral current loss. When the Neutral line is disconnected, it is no longer capable of sinking any current, so if a load were connected, it would match Line potential. Based on this, a Voltage sensitive device/circuit could be placed between Neutral and Earth Ground such that if the potential should exceed a set point, the device would start to conduct current, thus pulling the open Neutral's potential closer to the potential of Earth Ground. By pulling the open Neutral-to-Earth Ground, the GFCI will then have adequate power to properly function. One such voltage sensitive device that could be utilized is a DAIC, which does not conduct significant current until a threshold Voltage is reached. The Voltage sensitive device could be placed either on the Neutral on the Line input side or the Neutral on the Load Output Side to offer adequate open Neutral protection. Ideally the Voltage sensitive device/circuit should be placed on the Load side since the device could fail, thus triggering the GFCI and therefore offer improved fail-safe protection. Examples of other Voltage sensitive devices/circuits that may be used include, but are not limited to, the following: DIAC, TRIAC, SCR, SIDAC, Bipolar TVS, back-to-back Zener diodes and any other Voltage sensitive devices/circuits.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Figure 1:
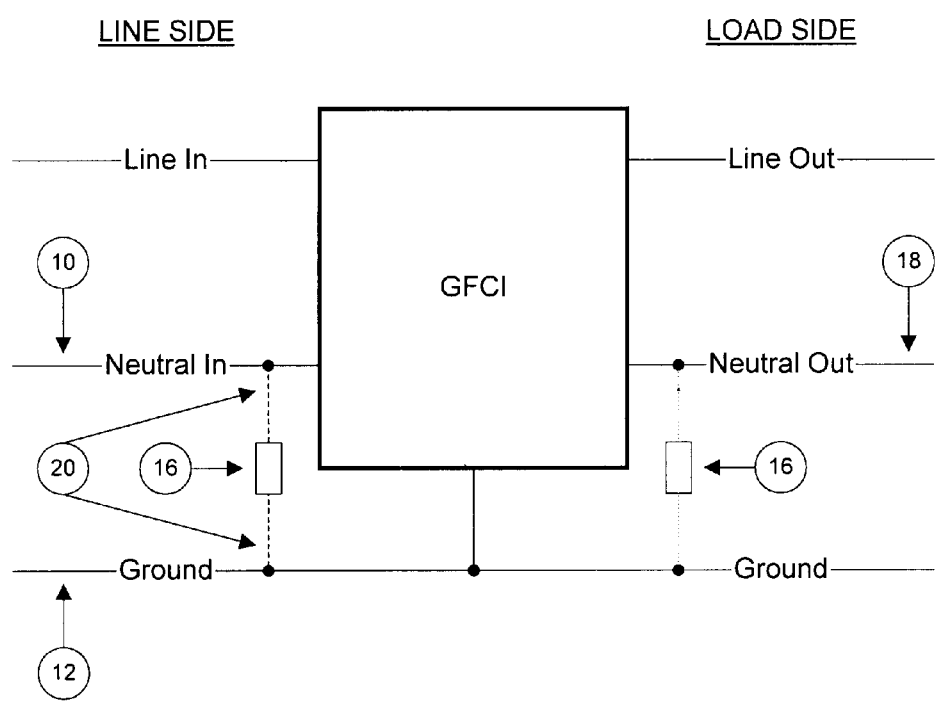
FIG. 1 is a perspective view of one embodiment of the present invention.

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

The present invention, as explained above, is an economical way in which to convert a standard class A GFCI outlet into an outlet GFCI with open neutral protection. As shown in FIG. 1, this may be accomplished by forming an electrical pathway 20 between neutral 10 on the line side and ground 12 of GFCI outlet 14. Positioned between neutral 10 and ground 14 on pathway 20 is a voltage sensitive device 16 which is capable of conducting current at a predetermined voltage. Of course, neutral 18 on the load side may be used as well instead of neutral 10.

Examples of voltage sensitive devices or circuits that may be used with the present invention include, but are not limited to, triac, diac, SCR, SIDAC, Bipolar TVS, back to back zener diodes, and a microprocessor.

In use, configuring a standard Class A GFCI in the manner described above, the GFCI will have open neutral protection in the event of a break in the neutral line which would result in a loss of power to the GFCI circuitry, which is well known to those of skill in the art. The present invention provides an electrical pathway which resupplies power to the GFCI circuitry by placing a voltage sensitive device or circuit between the neutral and ground which opens at a predetermined voltage level which is adapted to be exceeded in the event of a line break in the neutral. This configuration uses the low voltage present in the neutral to supply power to the GFCI circuitry.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. An improved ground fault circuit interrupt outlet comprising:

a voltage sensitive device which is capable of conducting current at a predetermined voltage;

said voltage sensitive device electrically connected between a ground on said ground fault circuit interrupt outlet and a neutral located on said ground fault circuit interrupt outlet, whereby said ground fault circuit interrupt outlet is converted into a ground fault circuit interrupt with open neutral protection and wherein said voltage sensitive device further comprises a threshold voltage that corresponds to a voltage difference between said neutral and said ground, and wherein said threshold voltage is less than a line potential and greater than two volts.

2. The device of claim 1 wherein said voltage sensitive device is located on said line side of said ground fault interrupt outlet.

3. The device of claim 1 wherein said voltage sensitive device is located on said load side of said ground fault interrupt outlet.

4. The device of claim 1 wherein said voltage sensitive device is a diac.

5. The device of claim 1 wherein said voltage sensitive device is a triac.

6. The device of claim 1 wherein said voltage sensitive device is a SCR.

7. The device of claim 1 wherein said voltage sensitive device is a SIDAC.

8. The device of claim 1 wherein said voltage sensitive device is a bipolar TVS.

9. The device of claim 1 wherein said voltage sensitive device is back to back zener diodes.

10. An outlet having a ground fault circuit interrupt circuitry comprising:
   an electrical pathway in communication with a neutral line and a ground line;
   said pathway conducts current to said GFCI circuitry in the event of a break in said neutral line; and
   a voltage sensitive device having a threshold voltage that corresponds to a voltage difference between said neutral and said ground, wherein said threshold voltage is less than a line potential and greater than two volts.

11. The device of claim 10 wherein said electrical pathway includes a said voltage sensitive device.

12. The device of claim 10 wherein said electrical pathway is located on a line side of said ground fault interrupt outlet.

13. The device of claim 10 wherein said electrical pathway is located on a load side of said ground fault interrupt outlet.

14. The device of claim 10 wherein said voltage sensitive device is a diac.

15. The device of claim 10 wherein said voltage sensitive device is a triac.

16. The device of claim 10 wherein said voltage sensitive device is a SCR.

17. The device of claim 10 wherein said voltage sensitive device is a SIDAC.

18. The device of claim 10 wherein said voltage sensitive device is a bipolar TVS.

19. The device of claim 10 wherein said voltage sensitive device is back to back zener diodes.

20. An improved ground fault circuit interrupt outlet comprising:
   a voltage sensitive device which is capable of conducting current at a predetermined voltage;
   said voltage sensitive device electrically connected between a ground on said ground fault circuit interrupt outlet and a neutral located on said ground fault circuit interrupt outlet, whereby said ground fault circuit interrupt outlet is converted into a ground fault circuit interrupt with open neutral protection, and wherein said voltage sensitive device is a SIDAC.

* * * * *